United States Patent
Harada (10) Patent No.: US 11,110,531 B2
(45) Date of Patent: Sep. 7, 2021

(54) THREAD FORMING TAP

(71) Applicant: OSG CORPORATION, Toyokawa (JP)

(72) Inventor: Kazumitsu Harada, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 21 days.

(21) Appl. No.: 16/486,305

(22) PCT Filed: Apr. 18, 2017

(86) PCT No.: PCT/JP2017/015576
§ 371 (c)(1),
(2) Date: Aug. 15, 2019

(87) PCT Pub. No.: WO2018/193515
PCT Pub. Date: Oct. 25, 2018

(65) Prior Publication Data
US 2020/0230727 A1 Jul. 23, 2020

(51) Int. Cl.
*B23G 7/02* (2006.01)

(52) U.S. Cl.
CPC ..................... *B23G 7/02* (2013.01)

(58) Field of Classification Search
CPC ... B23G 5/06; B23G 7/00; B23G 7/02; B23G 2200/14; B23G 2200/142; B23G 2200/146; B23G 2200/147; B23G 2200/44
See application file for complete search history.

(56) References Cited

U.S. PATENT DOCUMENTS 2,991,491 A * 7/1961 Welles, Jr. ............... B23G 7/02
470/204
3,125,772 A 3/1964 Beck
(Continued)

FOREIGN PATENT DOCUMENTS

| CN | 101549422 A | 10/2009 |
|---|---|---|
| CN | 101927382 A | 12/2010 |

(Continued)

OTHER PUBLICATIONS

English translation of International Search Report of International Application No. PCT/JP2017/015576 dated Jul. 4, 2017.
(Continued)

*Primary Examiner* — Edward T Tolan
(74) *Attorney, Agent, or Firm* — Muncy, Geissler, Olds & Lowe, P.C.

(57) ABSTRACT

An object is to provide a thread forming tap configured to obtain an inside diameter dimension of a female thread having a targeted processing accuracy more easily than in related art. A thread forming tap (1) is a cold forming tap for forming a female thread by causing plastic deformation of a prepared hole of a workpiece, and includes a male thread portion (3) that protrudes in a thread shape in a radial direction. The male thread portion includes at least one protruding portion (5), which includes a plurality of first thread ridges (51) arranged in an axial direction and that protrude in the radial direction and a first root (52) formed between the first thread ridges adjacent to each other in the axial direction, and at least one adjustment portion (6), which is arranged with the at least one protruding portion in one lead of the male thread portion. A distance from an axial center to a section of the adjustment portion corresponding to the first root in the one lead is longer than a root diameter of the first root and shorter than a ridge diameter of the first thread ridge adjacent to the first root.

10 Claims, 8 Drawing Sheets

(56) References Cited

U.S. PATENT DOCUMENTS

| | | | | |
|---|---|---|---|---|
| 3,171,146 | A | * 3/1965 | Moss | B21H 3/10 |
| | | | | 470/204 |
| 5,797,710 | A | 8/1998 | Sawabe et al. | |
| 6,217,267 | B1 | * 4/2001 | Sugano | B23G 7/02 |
| | | | | 408/222 |
| 9,682,435 | B2 | * 6/2017 | Yan | B23G 7/02 |
| 9,724,773 | B2 | * 8/2017 | Glimpel | B23G 7/02 |
| 2001/0041108 | A1 | 11/2001 | Sawabe | |
| 2012/0301236 | A1 | * 11/2012 | Ohhashi | B23G 5/20 |
| | | | | 408/22 |
| 2016/0059334 | A1 | 3/2016 | Yan et al. | |
| 2019/0283158 | A1 | * 9/2019 | Glimpel | B23G 7/02 |
| 2020/0030900 | A1 | * 1/2020 | Bihrer | B23G 5/06 |

FOREIGN PATENT DOCUMENTS

| | | |
|---|---|---|
| CN | 102712055 A | 10/2012 |
| DE | 102013101003 A1 | 7/2014 |
| JP | S64-030123 U | 2/1989 |
| JP | H9-155640 A | 6/1997 |
| JP | H9-272016 A | 10/1997 |
| JP | H11-309624 A | 11/1999 |

OTHER PUBLICATIONS

The Written Opinion of the International Searching Authority of International Application No. PCT/JP2017/015576 dated Jul. 4, 2017 and English Translation thereof.
Taiwanese Office Action dated Nov. 30, 2018 (Taiwanese Patent Application No. 107107525 based on the International Application No. PCT/JP2017/015576) and English Translation thereof.
Office action for the corresponding JP application No. 2019-513525 dated Jan. 26, 2021 and English translation thereof.
Office action for the corresponding KR application No. 10-2019-7026625 dated Feb. 16, 2021 and English translation thereof.
The extended European search report of the corresponding EP application No. 17906609.7 dated Nov. 3, 2020.
The office action issued for the corresponding CN application No. 201780089612.4 dated Nov. 24, 2020 and English machine translation thereof.
Office action for the corresponding CN application 201780089612.4 dated May 24, 2021 and English translation thereof.

* cited by examiner

| | WORKING EXAMPLE | COMPARATIVE EXAMPLE |
|---|---|---|
| PREPARED HOLE DIAMETER 7.36 mm | <br>FEMALE THREAD INSIDE DIAMETER 6.84 mm | <br>FEMALE THREAD INSIDE DIAMETER 6.70 mm |
| PREPARED HOLE DIAMETER 7.34 mm | <br>FEMALE THREAD INSIDE DIAMETER 6.83 mm | <br>FEMALE THREAD INSIDE DIAMETER 6.66 mm |

THREAD FORMING TAP

TECHNICAL FIELD

The present invention relates to a thread forming tap that is configured to form a female thread by causing plastic deformation of a prepared hole of a workpiece.

BACKGROUND ART

In related art, a cold forming tap is known as a tool for forming a female thread (refer to Patent Literature 1, for example). The cold forming tap disclosed in Patent Literature 1 is provided with a main body portion, a thread portion, a chamfer portion, and a burnishing portion. The main body portion is a part that extends in a cylindrical shape. The thread portion is a part that is arranged in a threaded shape on the outer circumference of the main body portion, and has a shape corresponding to the female thread. The chamfer portion is a part provided on a leading end side of the thread portion, and is a part whose diameter gradually decreases toward the leading end. A root of the chamfer portion is formed to be shallower than a root of the adjacent threaded portion. A root diameter of the chamfer portion is substantially equal to an inside diameter dimension of the female thread formed by processing. The burnishing portion can perform finishing processing by pressing the root of the chamfer portion against a crest portion of the female thread when the main body portion rotates in another direction. When the main body portion is rotated in one direction with respect to a prepared hole of a workpiece, the cold forming tap uses the thread portion to cause plastic deformation and cold forming of the workpiece, and thus forms the female thread. When the main body portion is rotated in a direction opposite to the one direction, the cold forming tap performs finishing processing of the crest portion of the formed female thread, using the burnishing portion.

CITATION LIST

Patent Literature

Patent Literature 1: Japanese Laid-Open Patent Publication No. 9-272016.

SUMMARY OF INVENTION

In the cold forming tap of the related art, in order to obtain the inside diameter dimension of the female thread having a targeted processing accuracy, it is necessary to adjust the diameter of the prepared hole with a high degree of accuracy.

An object of the present invention is to provide a thread forming tap capable of obtaining an inside diameter dimension of a female thread having a targeted processing accuracy more easily than in related art.

A thread forming tap of an aspect of the present invention is a thread forming tap for forming a female thread by causing plastic deformation of a prepared hole of a workpiece. The thread forming tap includes a male thread portion protruding in a thread shape in a radial direction. The male thread portion includes at least one protruding portion and at least one adjustment portion. The at least one protruding portion includes a plurality of first thread ridges arranged in an axial direction and protruding in the radial direction, and a first root formed between the first thread ridges adjacent to each other in the axial direction. The at least one adjustment portion is arranged with the at least one protruding portion in one lead of the male thread portion, a distance from an axial center to a section of the adjustment portion corresponding to the first root in the one lead is longer than a root diameter of the first root and shorter than a ridge diameter of the first thread ridge adjacent to the first root.

The thread forming tap according to present aspect is provided with the at least one protruding portion and the at least one adjustment portion in the one lead of the male thread portion. Therefore, while causing the plastic deformation of the prepared hole of the workpiece using the at least one protruding portion, the thread forming tap can adjust an inside diameter of the female thread using the adjustment portion. As a result, the thread forming tap can obtain the inside diameter dimension of the female thread having the targeted processing accuracy more easily than in the related art, without the strict dimension accuracy of the prepared hole as in the related art.

In the thread forming tap of the present aspect, the at least one adjustment portion may include a plurality of second thread ridges arranged in the axial direction and protruding in the radial direction, and a second root formed between the second thread ridges adjacent to each other in the axial direction, and a root diameter of the second root may be longer than the root diameter of the first root, and shorter than the ridge diameter of the first thread ridge adjacent to the first root. The thread forming tap according to this aspect can reliably suppress the workpiece that has been plastically deformed by the protruding portion from being excessively deformed by the adjustment portion in the direction around the axial center, using the second thread ridges.

In the thread forming tap of the present aspect, a contour of a cross section of the second root in the axial direction that passes through the axial center may be a straight line shape. The thread forming tap according to this aspect can form the female thread crests in a flat plane shape, using the adjustment portion.

In the thread forming tap of the present aspect, the ridge diameter of the first thread ridge in the one lead may be longer than a ridge diameter of the second thread ridge. Thus, when the workpiece that has been plastically deformed by the protruding portion is plastically deformed by the adjustment portion, the thread forming tap according to this aspect can cause the workpiece that has been plastically deformed along the second root to escape in the direction around the axial center. Specifically, when the workpiece that has been plastically deformed by the protruding portion is deformed by the adjustment portion, the thread forming tap can suppress a situation in which the thread forming tap is unable to rotate any further due to not having the capacity to deform the workpiece in the direction around the axial center.

In the thread forming tap of the present aspect, in the one lead, the male thread portion may be provided with the same number of and a plurality of the at least one protruding portion and the at least one adjustment portion, and the at least one protruding portion and the at least one adjustment portion may be alternately arranged in the one lead. Thus, since the protruding portion and the adjustment portion are alternately arranged in one lead of the male thread portion, the thread forming tap according to this aspect can efficiently and effectively perform the formation of the female thread and the adjustment of the inside diameter of the female thread.

DESCRIPTION OF EMBODIMENTS

Hereinafter, an exemplary embodiment of the present invention will be explained with reference to the appended drawings. Configurations of each of portions of a cold forming tap (a thread forming tap) 1 of the present invention will be explained with reference to FIG. 1 to FIG. 5. In the following explanation, an axial center of the cold forming tap 1 is denoted by AX, and, in an axial direction that is a direction along the axial center AX, a side on which a male thread portion 3 is provided with respect to a shank 2 is referred to as a leading end side, and an opposite side to the leading end side is referred to as a rear end side. In a plane perpendicular to the axial direction, a direction separating from the axial center AX is referred to as a radial direction. A direction of a circumference of a circle centered on the axial center AX is referred to as a circumferential direction.

1. Physical Configuration of Cold Forming Tap 1

Figure 1:
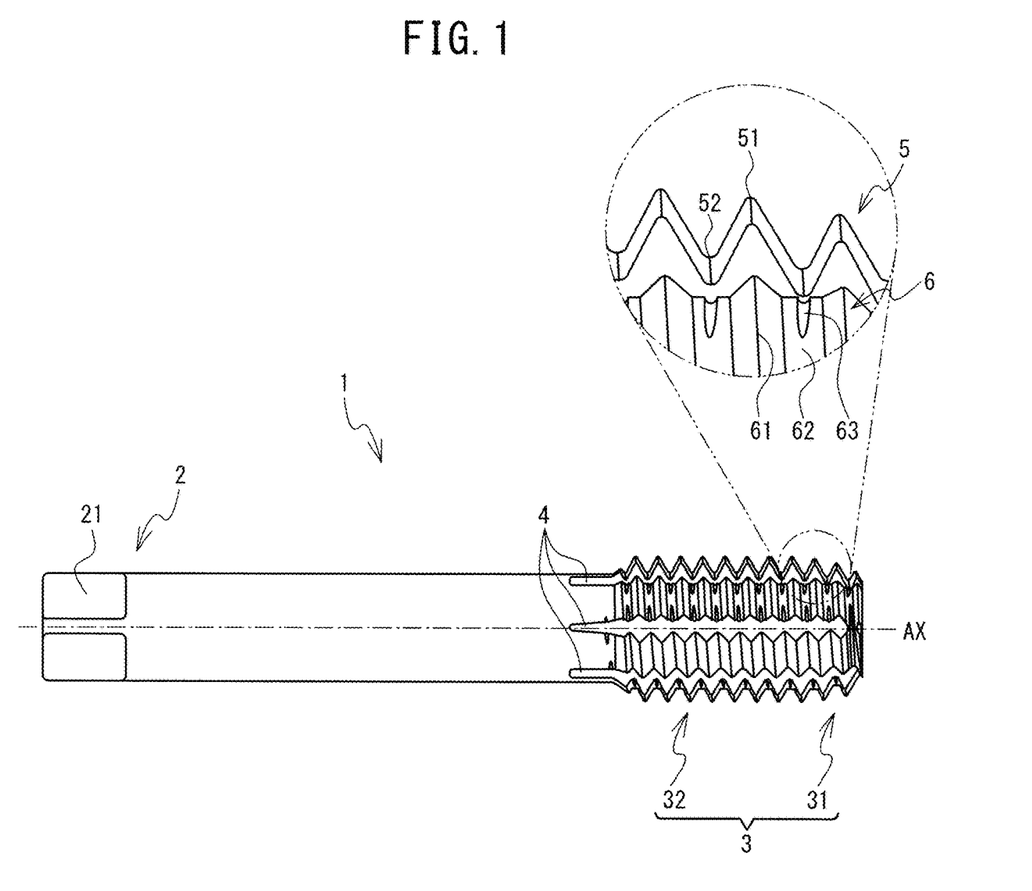
FIG. 1 is a front view of a cold forming tap 1.

As shown in FIG. 1, the cold forming tap 1 is a tool for forming a female thread by causing plastic deformation of a prepared hole of a workpiece. The cold forming tap 1 is provided with the shank 2 and the male thread portion 3. The shank 2 has a circular column shape having the axial center AX, and is made of high speed tool steel. The material of the shank 2 is not limited to the high speed tool steel, and may be a cemented carbide. A square portion 21 formed having a substantially square-shaped cross section is provided on the rear end side (the left side in FIG. 1) of the shank 2. The square portion 21 is held, for example, by a holding portion (not shown in the drawings) of processing equipment, such as a machining center.

Figure 3:
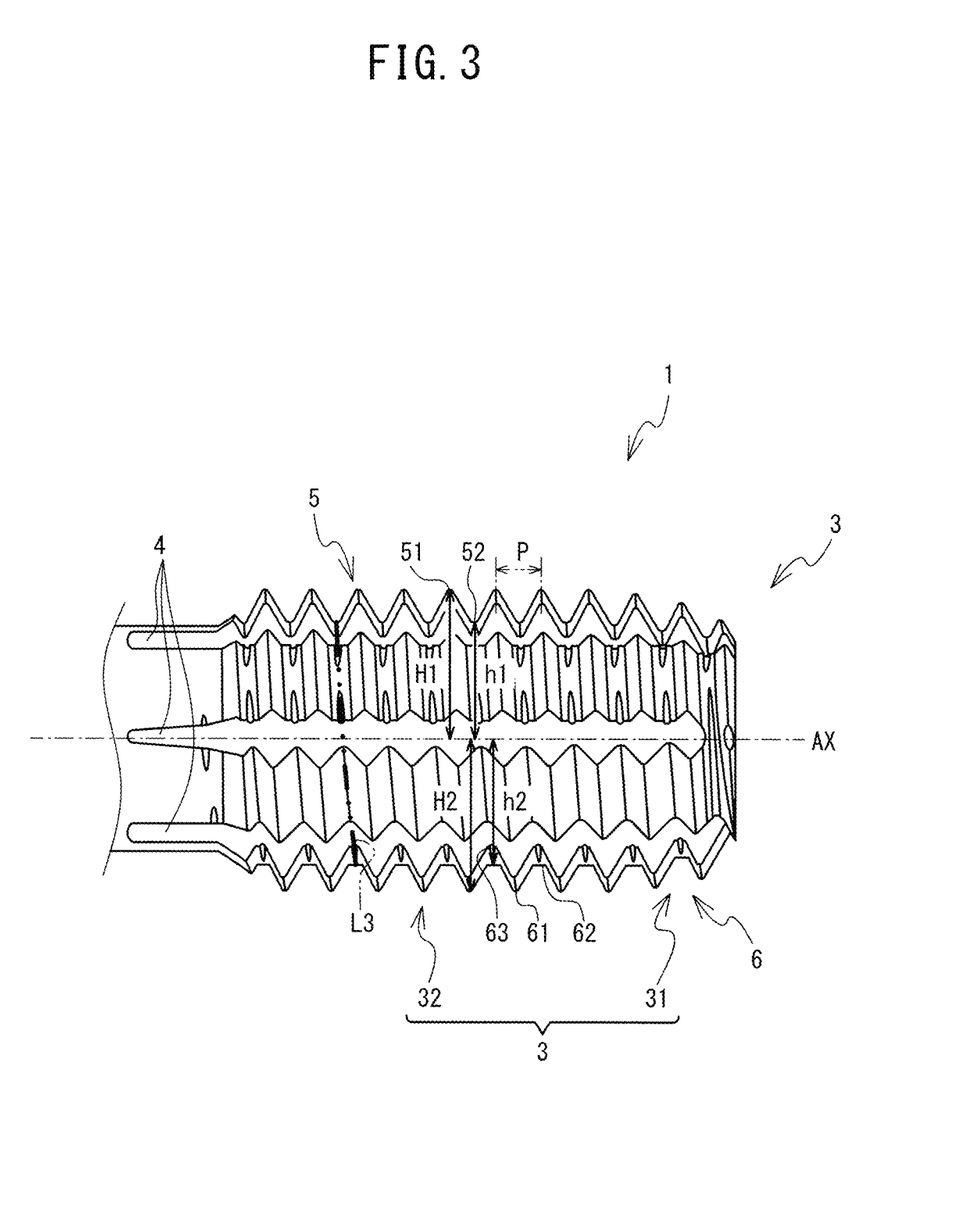
FIG. 3 is an expanded front view of a male thread portion 3 of the cold forming tap 1.

The male thread portion 3 is a part that is configured to form the female thread by causing the plastic deformation of the prepared hole provided in the workpiece. The male thread portion 3 is formed integrally with and from the same material as the shank 2. The male thread portion 3 protrudes in a thread shape in the radial direction along a virtual helical line corresponding to a prescribed lead angle, from a side surface of a circular column having the same axial center AX as the shank 2. The male thread portion 3 is provided with a chamfer portion 31 and a full thread portion 32 in the axial direction. In the processing of the female thread using the cold forming tap 1, the chamfer portion 31 is a part for roll forming the female thread by biting into a surface layer portion of the prepared hole in the workpiece and causing plastic deformation of the surface layer portion. The chamfer portion 31 corresponds to a number of pitches (2 to 5 pitches, for example) from the leading end side of the male thread portion 3. In FIG. 3, the pitch is denoted by P, and is a center-to-center distance between adjacent thread ridges.

In the processing of the female thread using the cold forming tap 1, the full thread portion 32 is a part that is configured to perform finishing of the surface of the female thread formed using the chamfer portion 31. The full thread portion 32 is a shape that substantially conforms to the shape of the thread ridges of the female thread that is the workpiece to be processed by the cold forming tap 1.

The cold forming tap 1 of the present embodiment is further provided with a lubrication groove 4. The lubrication groove 4 is a groove for improving a lubricating effect in a plastic working process of the female thread, and supplies tapping oil to a plastic working surface of the workpiece. The lubrication groove 4 is formed in a straight line parallel to the axial center AX, from the leading end side to the rear end side of the male thread portion 3.

Figure 2:
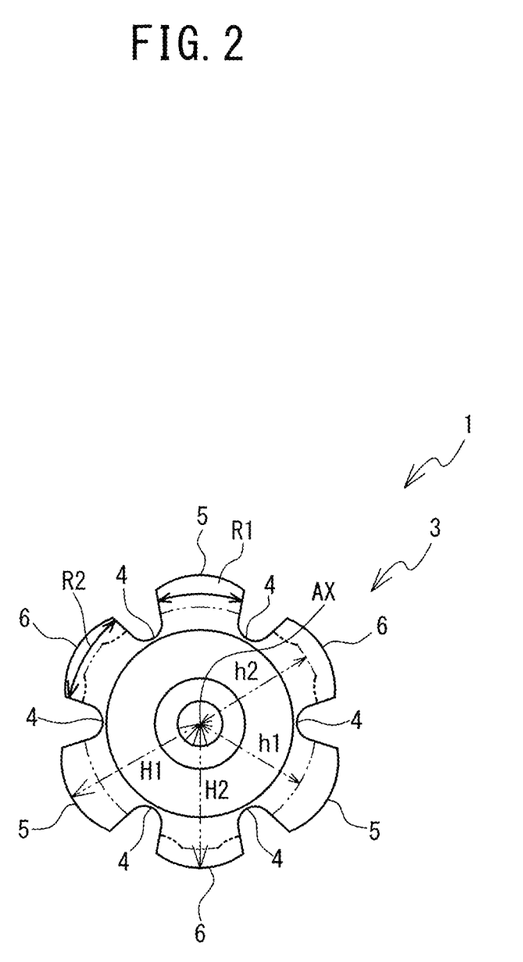
FIG. 2 is a right side view of the cold forming tap 1.

The male thread portion 3 is provided, in the circumferential direction, with protruding portions 5 and adjustment portions 6. The male thread portion 3 of the present embodiment is provided with the same number of and a plurality of the protruding portions 5 and the adjustment portions 6 in one lead. The protruding portions 5 and the adjustment portions 6 are arranged alternately in one lead. "In one lead" refers to a range, in the circumferential direction, that corresponds to one rotation of the virtual helical line around the axial center AX. The male thread portion 3 of the present embodiment is provided with three of the protruding portions 5 and three of the adjustment portions 6 in one lead, and the protruding portions 5 and the adjustment portions 6 are alternately arranged in the circumferential direction. In the present embodiment, a number of the lubrication grooves 4 is equal to the sum of the number of protruding portions 5 and the number of adjustment portions 6 in one lead. The lubrication grooves 4 are arranged between the protruding portions 5 and the adjustment portions 6 in the circumferential direction. In other words, the protruding portion 5 or the adjustment portion 6 is arranged between two of the lubrication grooves 4. An extending range of the protruding portion 5 and the adjustment portion 6 in the circumferential direction is partitioned by the lubrication groove 4. When the cold forming tap 1 is seen from the leading end side, as shown in FIG. 2, the protruding portions 5 and the adjustment portions 6 are arranged so as to face each other with respect to the axial center AX. The protruding portions 5 and the adjustment portions 6 are provided on each of the chamfer portion 31 and the full thread portion 32 in the axial direction.

The protruding portions 5 include a plurality of first thread ridges 51 that protrude in the radial direction, and first roots 52 that are formed between the first thread ridges 51 adjacent to each other in the axial direction. The first thread ridges 51 are arranged along the virtual helical line corresponding to the prescribed lead angle. The first thread ridges 51 and the first roots 52 of the present embodiment are provided alternately in the axial direction.

The adjustment portions 6 are arranged along with the protruding portions 5 in one lead of the male thread portion 3. A distance from the axial center AX to a section of the adjustment portion 6 that corresponds to the first root 52 in one lead is longer than a root diameter h1 of the first root 52, and is shorter than a ridge diameter H1 of the first thread ridge 51 adjacent to the first root 52. In order for the distance from the axial center AX to satisfy the above-described conditions, it is sufficient that the section at least be a part that is on the same virtual helical line as the first root 52. The distance from the axial center AX is set while taking into account the inside diameter of the female thread. The adjustment portions 6 of the present embodiment include a plurality of second thread ridges 61 that are arranged in the axial direction and that protrude in the radial direction, and second roots 62 that are formed between the second thread ridges 61 adjacent to each other in the axial direction. A center in the axial direction of the second root 62 is arranged on a virtual helical line that passes through a center in the axial direction of the first root 52. A root diameter h2 of the second root 62 is longer than the root diameter h1 of the first root 52 in one lead from the second root 62, and is shorter than the ridge diameter H1 of the first thread ridge 51 adjacent to the first root 52. The second thread ridges 61 are arranged along the same virtual helical line as the first thread ridges 51. The second thread ridges 61 and the second roots 62 are arranged alternately in the axial direction. The adjustment portions 6 of the present embodiment extend in the axial direction. As shown in FIG. 2, a length R2 of an extending range of the adjustment portion 6 in the circumferential direction is substantially the same as a length R1 of an extending range of the protruding portion 5 in the circumferential direction. In FIG. 2, the first roots 52 and the second roots 62 of the full thread portion 32 along a virtual helical line L3 shown in FIG. 3 are shown using virtual lines.

Figure 4:
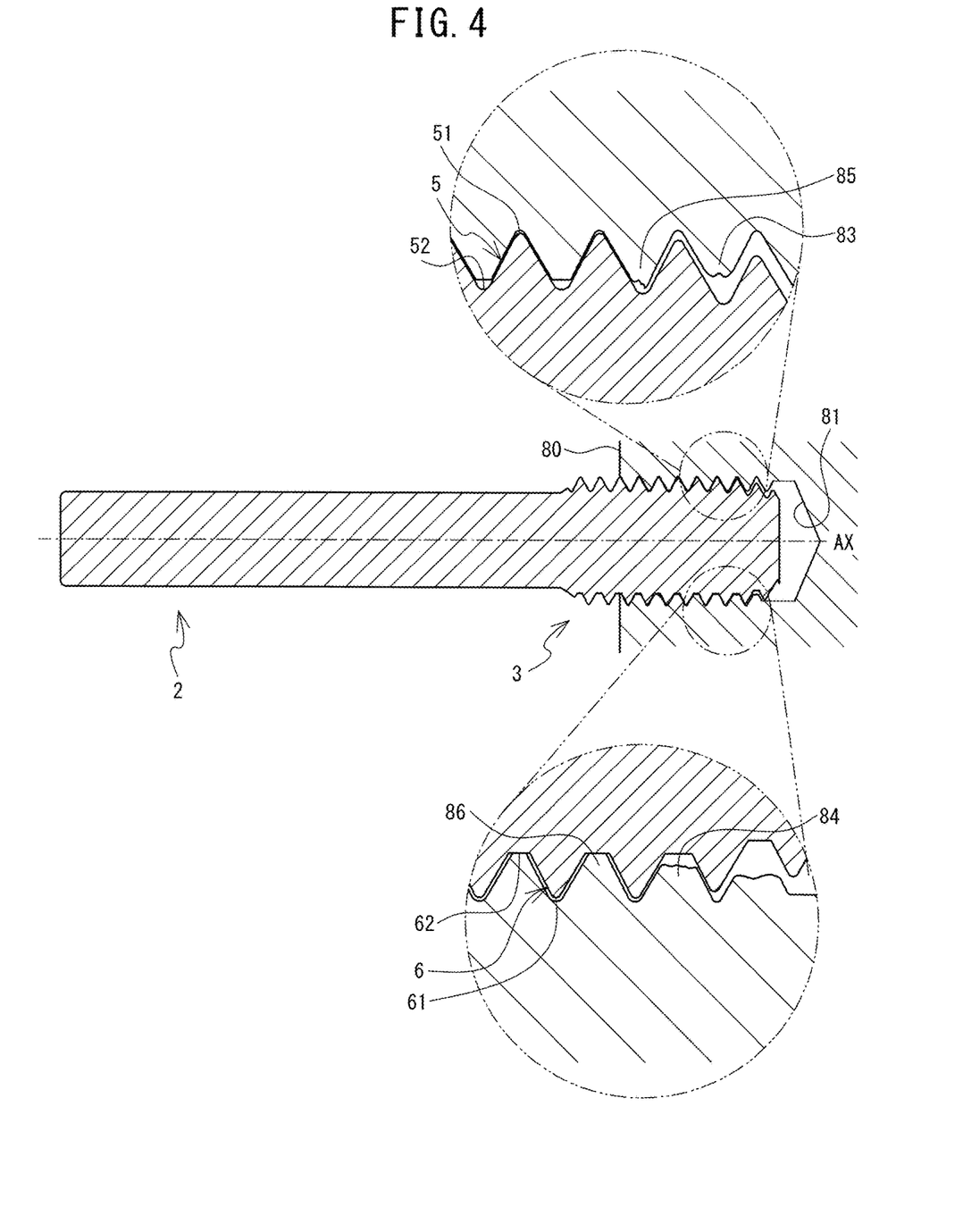
FIG. 4 is a cross-sectional view at a time of plastic working of a prepared hole 81 of a workpiece 80 using the cold forming tap 1.

Each of the second roots 62 is formed to have a predetermined length in the axial direction, and the second roots 62 are provided in a plane so as to have the same distance from the axial center AX in the axial direction. As shown in FIG. 4, in a cross section along the axial direction that passes through the axial center AX, while the first roots 52 have a circular arc shape that protrudes to the side of the axial center AX, the second roots 62 have a straight line shape. Each of the second roots 62 includes groove portions 63, which are recessed toward the axial center AX, at both of end portions of the second root 62 in the circumferential direction. A recess amount in the radial direction of each of the groove portions 63 is larger the closer it is to the end portion of the second root 62 in the circumferential direction. The depth of each of the groove portions 63 becomes shallower toward the center of the second root 62 in the circumferential direction, from the end portions of the second root 62 in the circumferential direction. At least at the center of the second root 62 in the circumferential direction, it is sufficient that the root diameter h2 of the second root 62 be longer than the root diameter h1 of the first root 52 in one lead from the second root 62, and be shorter than the ridge diameter H1 of the first thread ridge 51 adjacent to the first root 52. The groove portions 63 do not reach a center portion of the adjustment portion 6 in the circumferential direction. The center portion of the adjustment portion 6 in the circumferential direction is, for example, within a range between 1/10 to 2/3 the length R2 of the extending range of the adjustment portion 6, centered on a center of the adjustment portion 6 in the circumferential direction.

Figure 5:
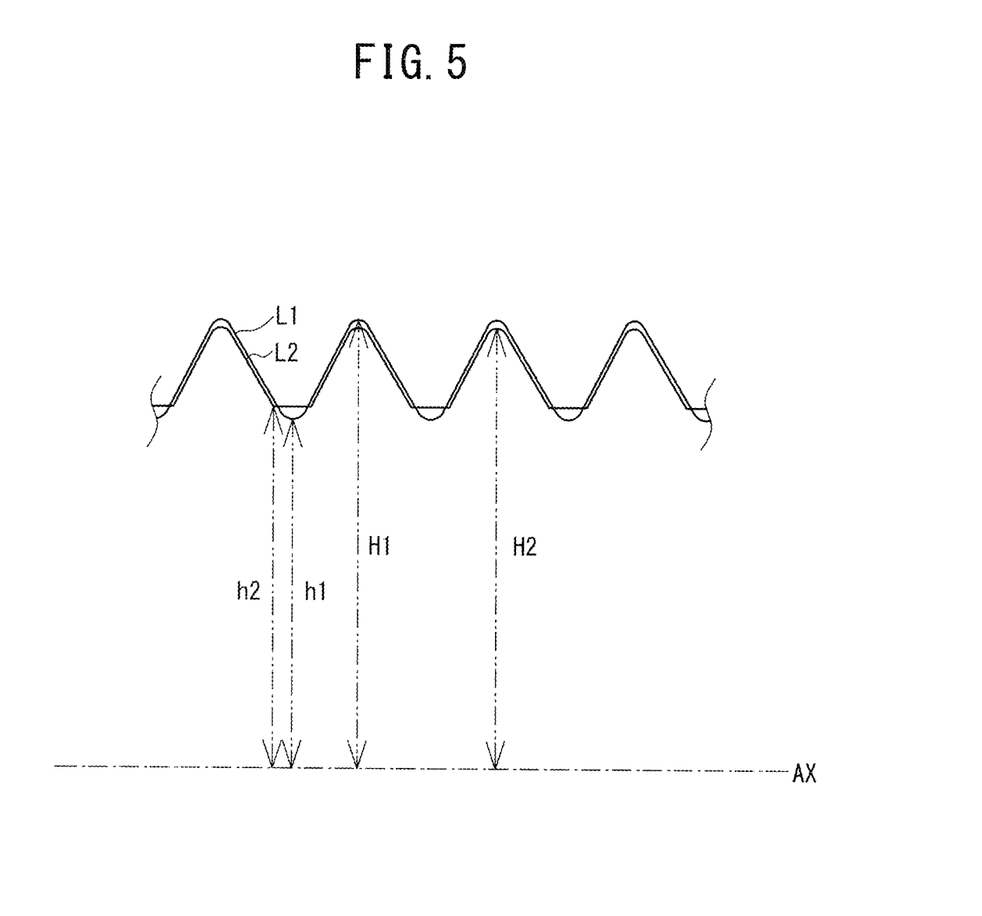
FIG. 5 is an explanatory diagram in which, in a full thread portion 32, a contour L1 in an axial direction of protruding portions 5 in one lead, and a contour L2 in the axial direction of adjustment portions 6 are overlapped in a state in which centers of thread ridges in the axial direction are aligned.

The ridge diameter H1 of the first thread ridges 51 in one lead is longer than the ridge diameter H2 of the second thread ridges 61. As shown in FIG. 5, in the full thread portion 32, when a contour L1 in the axial direction of the protruding portions 5 in one lead and a contour L2 in the axial direction of the adjustment portions 6 are overlapped in a state in which centers in the axial direction of the thread ridges are aligned, the contour L1 corresponding to the first thread ridges 51 is on the outer side (the upper side in FIG. 5) of the contour L2 corresponding to the second thread ridges 61. The contour L1 corresponding to the first roots 52 is further to the axial center AX side (the lower side in FIG. 5) than the contour L2 corresponding to the second roots 62. Each of the protruding portions 5 and the adjustment portions 6 may be provided with a known margin portion and relief portion in the circumferential direction. The margin portion may be provided in a center portion, in the circumferential direction, of the protruding portion 5 and the adjustment portion 6. The relief portion may be a part provided at both ends of the margin portion in the circumferential direction, and may be a part whose length in the radial direction from the axial center AX is shorter than that of the margin portion. In this case, taking into account that the margin portion and the relief portion are provided in each of the protruding portions 5 and the adjustment portions 6, it is sufficient that the adjustment portion 6 have a part at which the distance from the axial center AX to the section of the adjustment portion 6 that corresponds to the first root 52 in one lead is longer than the root diameter h1 of the first root 52, and is shorter than the ridge diameter H1 of the first thread ridge 51 adjacent to the first root 52.

2. Plastic Working Process of Female Thread by Cold Forming Tap 1

The plastic working process to form the female thread by causing the plastic deformation of a prepared hole 81 of a workpiece 80 using the cold forming tap 1 will be explained with reference to FIG. 4. The cold forming tap 1 is attached to processing equipment that is not shown in the drawings. Then, the cold forming tap 1 is caused to rotate in one direction, and the chamfer portion 31 is caused to enter into the prepared hole 81 of the workpiece 80. As a result of the pressure contact by the chamfer portion 31, plastic flow occurs in the workpiece 80, and, as exemplified by parts 83 and 84, a thread ridge shape is formed by plastic deformation along the contour of the chamfer portion 31. When the full thread portion 32 reaches the prepared hole 81, the female thread ridges of the workpiece 80 are further cold formed, and, as exemplified by a part 85, crest portions are cold formed as far as the vicinity of the first roots 52 in the protruding portions 5. The crests of the female thread protruding in the radial direction as far as the vicinity of the first roots 52 in the protruding portions 5 are guided to the groove portions 63 of the adjustment portions 6 in the same lead, and are caused to be plastically deformed by being pressed against the center portions, in the circumferential direction, of the second roots 62. In this way, the crests of the female thread protruding in the radial direction as far as the vicinity of the first roots 52 in the protruding portions 5 are subject to finishing processing along a contour of the second roots 62, as exemplified by a part 86. In other words, the adjustment portions 6 have a function to burnish the inside diameter of the female thread formed by the protruding portions 5. Burnishing the inside diameter of the female thread includes causing the plastic deformation of the crests of the female thread protruding in the radial direction, along the contour of the second roots 62. The ridge diameter H1 of the first thread ridges 51 is larger than the ridge diameter H2 of the second thread ridges 61. Thus, the parts that are deformed by being pressed against the second roots 62 can move to the side of the second thread ridges 61. In this way, the forming of ridges of the female thread and the adjustment of the inside diameter of the ridges of the female thread are alternately performed in the same lead, and the female thread is formed. The inside diameter of the female thread of the workpiece 80 is processed so as to be substantially the same as the root diameter h2 of the second roots 62 of the full thread portion 32 of the cold forming tap 1.

3. Evaluation Tests of Cold Forming Tap 1

Tests to evaluate the inside diameters of formed female threads were performed using the cold forming tap 1 of the above-described embodiment as a working example and a cold forming tap in which a male thread portion is configured only by the protruding portions 5 as a comparative example. Apart from the presence and absence of the adjustment portions 6, the rest of the configuration of the working example and the comparative example was the same.

Figure 6:
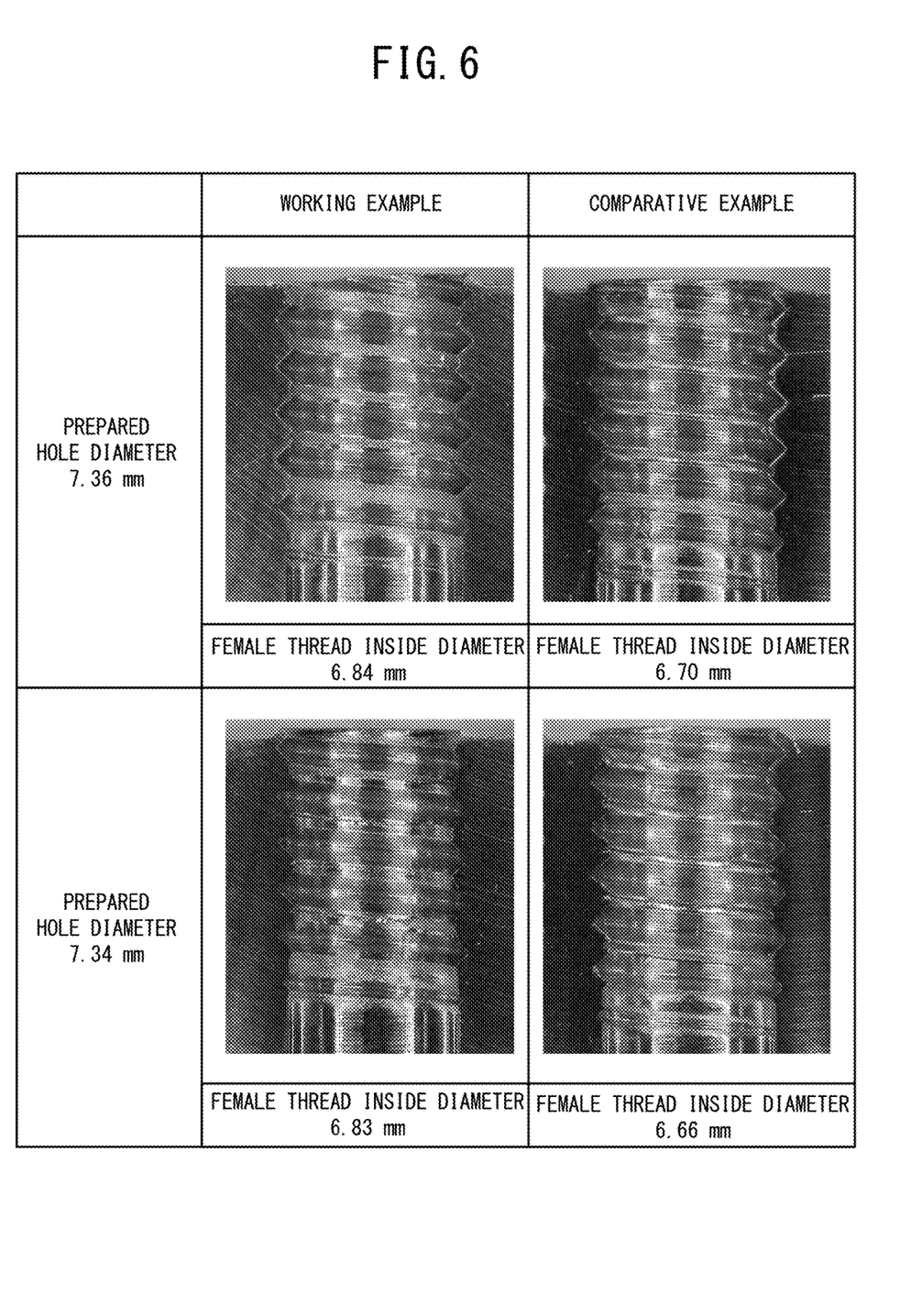
FIG. 6 is an explanatory diagram of evaluation test results.

Test conditions of the working example and the comparative example were as follows. A workpiece was made of low carbon steel (SS400). Diameters of prepared holes were set as two conditions, namely, 7.36 mm, and 7.34 mm. A tap accuracy was the same for the working example and the comparative example. Evaluation test results are shown in FIG. 6. In FIG. 6, photos of the female threads formed in each of the working example and the comparative example, and the inside diameters of the female threads are shown. In the photos of the working example, parts that are visibly shiny in which the inside diameter is cold formed were verified. In the working example, due to the adjustment portions, portions cut into the inside diameter were processed, and were processed into a flat shape in which distances from an axial center were equal. As shown in FIG. 6, when the diameter of the prepared hole was 7.36 mm, the inside diameter of the formed female thread was 6.84 mm in the working example, while the inside diameter of the formed female thread was 6.70 mm in the comparative example. When the diameter of the prepared hole was 7.34 mm, the inside diameter of the formed female thread was 6.83 mm in the working example, while the inside diameter of the formed female thread was 6.66 mm in the comparative example. From the above results, under conditions in which the diameter of the prepared hole differed by 0.02 mm, a difference of approximately 0.04 mm occurred between the inside diameters of the formed female threads in the comparative example, while this difference was 0.01 mm in the working example. From the above, it was verified that the cold forming tap 1 can obtain a targeted processing accuracy for the inside diameter dimension of the female thread more easily than in the related art, without the strict dimension accuracy of the prepared hole of the workpiece as in the related art.

In the cold forming tap 1 of the above-described embodiment, the cold forming tap 1, the male thread portion 3, the first thread ridge 51, the first root 52, the protruding portion 5, and the adjustment portion 6 are, respectively, an example of a cold forming tap, a male thread portion, a first thread ridge, a first root, a protruding portion, and an adjustment portion of the present invention. The second thread ridge 61 and the second root 62 are, respectively, an example of a second thread ridge and a second root of the present invention.

The cold forming tap 1 is provided with the protruding portions 5 and the adjustment portions 6 in one lead of the male thread portion 3. Thus, while causing the plastic deformation of the prepared hole 81 of the workpiece 80 using the protruding portions 5, the cold forming tap 1 can adjust the inside diameter of the female thread using the adjustment portions 6. As a result, the cold forming tap 1 can obtain the inside diameter dimension of the female thread having the targeted processing accuracy more easily than in the related art, without the strict dimension accuracy of the prepared hole as in the related art. Even if a diameter of the prepared hole before threading is smaller than a lower limit value of a dimension tolerance of the prepared hole diameter when using the cold forming tap of the related art, the adjustment portions 6 can finish the inside diameter within a predetermined range. With the cold forming tap 1, the lower limit side of the dimension tolerance of the prepared hole diameter can be extended compared to the related art, and the processing of the prepared hole can be easily performed. As a method for using a tap, there are cases in which the tap is only used with forward rotation (a bent shank tap, for example), and with the cold forming tap 1, even when being used with the forward rotation only, the inside diameter of the female thread can be adjusted by the adjustment portions 6.

The adjustment portions 6 include the plurality of second thread ridges 61 that are arranged in the axial direction and that protrude in the radial direction, and the second roots 62 that are formed between the second thread ridges 61 adjacent to each other in the axial direction. The root diameter h2 of the second roots 62 is longer than the root diameter h1 of the first roots 52 in one lead, and is shorter than the ridge diameter H1 of the first thread ridges 51 adjacent to the first roots 52. As a result, using the second thread ridges 61, the cold forming tap 1 can reliably suppress the workpiece 80 that has been plastically deformed by the protruding portions 5 from being excessively deformed by the adjustment portions 6 in the direction around the axial center AX (the circumferential direction).

A contour of a cross section of the second root 62 in the axial direction that passes through the axial center AX is a straight line shape. The cold forming tap 1 can form the female thread crests in a flat plane shape, using the adjustment portions 6. Thus, the cold forming tap 1 can stably obtain the inside diameter dimension of the female thread that has good accuracy.

The ridge diameter H1 of the first thread ridges 51 in one lead is longer than the ridge diameter H2 of the second thread ridges 61. Thus, when the workpiece 80 that has been plastically deformed by the protruding portions 5 is plastically deformed by the adjustment portions 6, the cold forming tap 1 can cause the workpiece 80 that has been plastically deformed along the second roots 62 to escape in the direction around the axial center AX (the circumferential direction). Specifically, when the workpiece 80 that has been plastically deformed by the protruding portions 5 is deformed by the adjustment portions 6, the cold forming tap 1 can suppress a situation in which the cold forming tap 1 is unable to rotate any further due to not having the capacity to deform the workpiece 80 in the direction around the axial center AX.

The male thread portion 3 is provided with the plurality of and the same number of the protruding portions 5 and the adjustment portions 6 in one lead, and the protruding portions 5 and the adjustment portions 6 are alternately arranged in one lead. Thus, since the protruding portions 5 and the adjustment portions 6 are alternately arranged in one lead of the male thread portion 3, the cold forming tap 1 can efficiently and effectively perform the formation of the female thread and the adjustment of the inside diameter of the female thread. In comparison to a case in which the protruding portions 5 and the adjustment portions 6 are not alternately arranged, the cold forming tap 1 offers a good balance of load stress when performing the plastic working. In the circumferential direction, the length R1 of the extending range of the protruding portion 5 and the length R2 of the extending range of the adjustment portion 6 are substantially the same.

MODIFIED EXAMPLES

Figure 7:
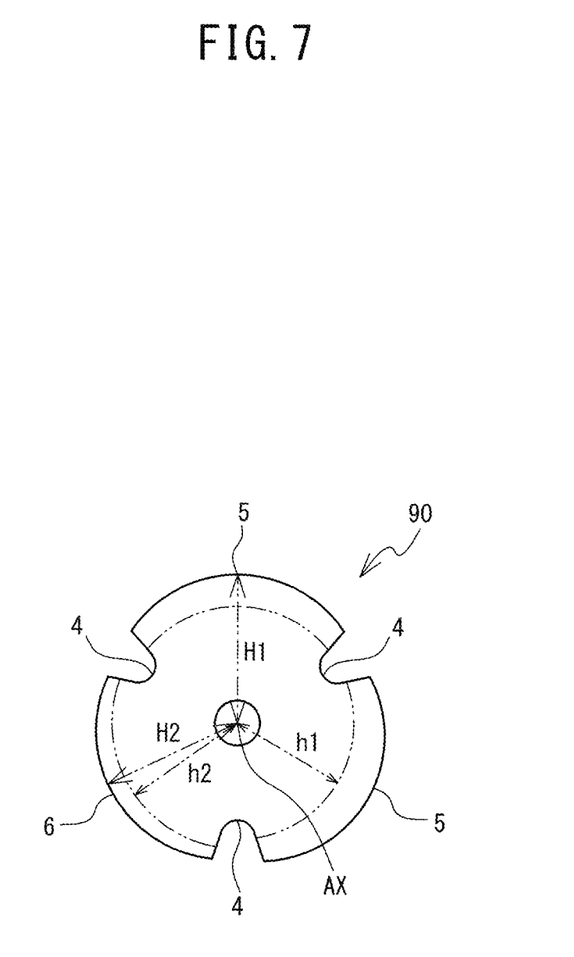
FIG. 7 is a right side view of a cold forming tap 90 of a modified example.
Figure 8:
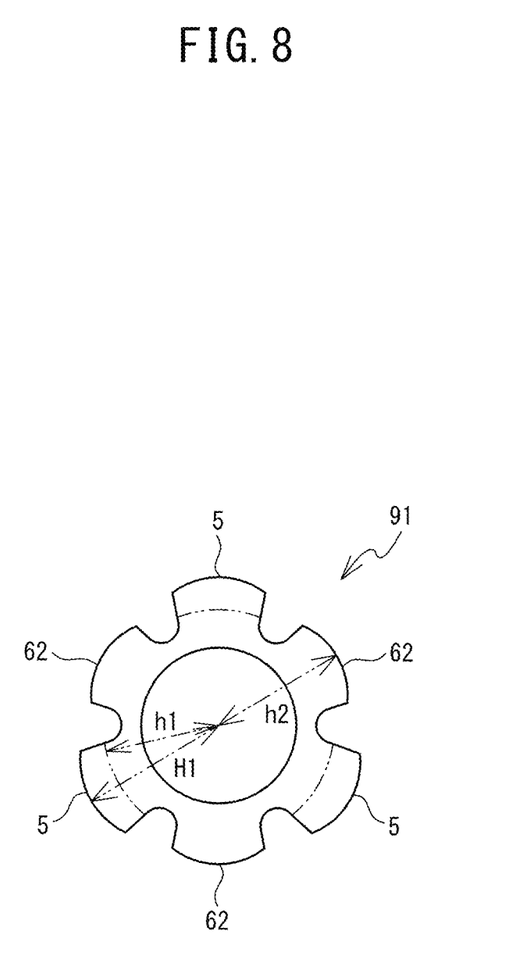
FIG. 8 is a right side view of a cold forming tap 91 of a modified example.

The main body portion of the thread forming tap (the cold forming tap) of the present invention is not limited to the above-described embodiment, and various modifications can be made insofar as they do not depart from the scope and spirit of the present invention. For example, the following modifications may be added as appropriate. In FIG. 7 and FIG. 8, which show modified examples, the same reference numerals are assigned to a configuration that is the same as that of the cold forming tap 1. As in FIG. 2, FIG. 7 and FIG. 8 indicate the first roots 52 and the second roots 62 of the full thread portion 32 using virtual lines. Note, however, that in FIG. 7 and FIG. 8, the virtual lines indicating the second roots 62 do not take the groove portions 63 into account.

It is preferable for the shank 2 and the male thread portion 3 to be integrally formed in the cold forming tap 1, but the male thread portion 3 may be configured to be detachably attached to the shank 2. In this case, in the plastic working of the female thread by the cold forming tap 1, the male thread portion 3 may be integrally fixed to the leading end portion of the shank 2 and used. The shank 2 of the cold forming tap 1 need not necessarily be provided with the square portion 21. The cold forming tap 1 need not necessarily be held by the holding portion of the processing equipment, such as the machining center, and used. The shank 2 and the male thread portion 3 may be configured from mutually different materials. For example, the shank 2 may be configured by high speed tool steel, and the male thread portion 3 may be configured by a cemented carbide.

The number of the protruding portions and the adjustment portions in one lead of the cold forming tap 1 may be changed as appropriate. It is sufficient that the respective number of the protruding portions and the adjustment portions in one lead is one or more. For example, as with a cold forming tap (a thread forming tap) 90 of a modified example shown in FIG. 7, the number of the protruding portions 5 and the number of the adjustment portions 6 of the cold forming tap 1 may be different from each other. As with the cold forming tap 90, the protruding portions 5 and the adjustment portion 6 need not necessarily be alternately arranged in the circumferential direction. It is sufficient that the sum of the number of the protruding portions 5 and the number of the adjustment portions 6 in one lead be two or more. For example, when the cold forming tap is provided with four of the protruding portions and four of the adjustment portions in one lead, the protruding portions and the adjustment portions may be alternately arranged, or a set of two of the protruding portions and a set of two of the adjustment portions may be alternately arranged in the circumferential direction. For example, when the cold forming tap is provided with four of the protruding portions and two of the adjustment portions in one lead, a set of two of the protruding portions and the adjustment portion may be alternately arranged in the circumferential direction. Each of the protruding portions and the adjustment portions need not necessarily be parallel to the axial direction, and may be provided in a spiral shape. Each of the protruding portions 5 and the adjustment portions 6 need not necessarily be provided with the known margin portion in the circumferential direction.

The adjustment portion 6 need not necessarily be provided with the second thread ridge 61 and the second root 62. For example, as with a cold forming tap 91 of a modified example shown in FIG. 8, the adjustment portion need not necessarily be provided with the second thread ridge 61 and may be formed by only the second root 62, at which the distance from the axial center AX is h2. In this case also, it is sufficient that the distance h2 from the axial center AX satisfy the conditions of being longer than the root diameter h1 of the first root 52 of the protruding portion 5, and being shorter than the ridge diameter H1 of the first thread ridge 51 adjacent to the first root 52. When the adjustment portion is provided with the second root, the contour of the cross section of the second root in the axial direction that passes through the axial center AX need not necessarily be the straight line shape, and similarly to the first root, the contour of the cross section of the second root may be a curved line shape that protrudes toward the axial center AX, for example. The second root 62 need not necessarily be provided with the groove portions 63 at both the end portions in the circumferential direction, and may be provided with only one of the groove portions 63 at one side in the circumferential direction. The shape of the groove portion 63 may be changed as appropriate. The length R2 of the extending range of the adjustment portion 6 in the circumferential direction need not necessarily be substantially the same as the length R1 of the extending range of the protruding portion 5 in the circumferential direction. The adjustment portions need not necessarily be provided over a whole range of the male thread portion in the axial line direction. For example, it is sufficient that the adjustment portion be provided on at least a part of the full thread portion and need not necessarily be provided on the chamfer portion.

The shape of the first thread ridge, the first root, the second thread ridge, and the second root may be changed as appropriate. A contour in the axial direction of the crests of the first thread ridge and the second thread ridge may be on a straight line. The ridge diameter of the first thread ridges in one lead need not necessarily be longer than the ridge diameter of the second thread ridges. The ridge diameter H1 of the first thread ridges 51 may be the same as the ridge diameter H2 of the second thread ridges 61. For example, in the full thread portion 32, when the contour in the axial direction of the protruding portions in one lead and the contour in the axial direction of the adjustment portions are overlapped in a state in which centers in the axial direction of the thread ridges are aligned, the contour corresponding to the first thread ridges may be substantially aligned with the contour corresponding to the second thread ridges.

The configuration of the lubrication groove 4 may be changed as appropriate. The cross-sectional shape of the lubrication groove 4 is not particularly limited, and the lubrication groove 4 may be recessed such that a cross section thereof has a substantially V shape, for example. The number of the lubrication grooves 4 provided may be any desired number. From the viewpoint of the balance of the load stress when the plastic working is performed, it is preferable that the lubrication grooves 4 be arranged symmetrically with respect to the axial center AX. The lubrication groove 4 may be provided in a spiral shape. The lubrication groove 4 may be provided on only part of the male thread portion 3 from the leading end side to the rear end side thereof. For example, the lubrication groove 4 may be provided only on the leading end side of the male thread portion 3. The number of the lubrication grooves 4 need not necessarily match the sum of the number of the protruding portions 5 and the number of the adjustment portions 6. The lubrication groove 4 may be omitted as necessary.

Through this specification, a term, "diameter," is used to describe the sizes or lengths of the male thread portion with respect to the radial direction, which is oriented at the right angle with the axial direction. For example, references H1, H2, h1 and h2 are used to describe these sizes. The size and sizes may be termed as a radius or radii according to their context, which mean half a diameter.

The invention claimed is:

1. A thread forming tap for forming a female thread by causing plastic deformation of a prepared hole of a workpiece wherein the thread forming tap extends in an axial direction, the thread forming tap comprising:
a male thread portion protruding in a thread shape in a radial direction, which is perpendicular to the axial direction, the male thread portion including:
at least one protruding portion including a plurality of first thread ridges arranged in the axial direction and protruding in the radial direction, and a first root formed between the first thread ridges adjacent to each other in the axial direction; and
at least one adjustment portion arranged with the at least one protruding portion in one lead of the male thread portion, a distance in the radial direction from an axial center of the thread forming tap to a section of the adjustment portion corresponding to the first root in the one lead being longer than a root radius of the first root and shorter than a ridge radius of the first thread ridge adjacent to the first root, wherein
the male thread portion is segmented into two portions that are a full thread portion and a chamfer portion,
the full thread portion having a shape corresponding to target thread ridges of the female thread to be formed on the workpiece by the thread forming tap, and
the chamfer portion being provided on a leading end side with respect to the full thread portion in the axial direction of the thread forming tap, and
the at least one protruding portion and the at least one adjustment portion are provided in the full thread portion.

2. The thread forming tap according to claim 1, wherein the at least one adjustment portion includes a plurality of second thread ridges arranged in the axial direction and protruding in the radial direction, and a second root formed between the second thread ridges adjacent to each other in the axial direction, and
a root radius of the second root is longer than the root radius of the first root, and shorter than the ridge radius of the first thread ridge adjacent to the first root.

3. The thread forming tap according to claim 2, wherein a contour of a cross section of the second root in the axial direction that passes through the axial center is a straight line shape.

4. The thread forming tap according to claim 2, wherein the ridge radius of the first thread ridge in the one lead is longer than a ridge radius of the second thread ridge.

5. The thread forming tap according to claim 3, wherein the ridge radius of the first thread ridge in the one lead is longer than a ridge radius of the second thread ridge.

6. The thread forming tap according to claim 1, wherein
in the one lead, the male thread portion is provided with the same number of and a plurality of the at least one protruding portion and the at least one adjustment portion, and
the at least one protruding portion and the at least one adjustment portion are alternately arranged in the one lead.

7. The thread forming tap according to claim 2, wherein
in the one lead, the male thread portion is provided with the same number of and a plurality of the at least one protruding portion and the at least one adjustment portion, and
the at least one protruding portion and the at least one adjustment portion are alternately arranged in the one lead.

8. The thread forming tap according to claim 3, wherein
in the one lead, the male thread portion is provided with the same number of and a plurality of the at least one protruding portion and the at least one adjustment portion, and
the at least one protruding portion and the at least one adjustment portion are alternately arranged in the one lead.

9. The thread forming tap according to claim 4, wherein
in the one lead, the male thread portion is provided with the same number of and a plurality of the at least one protruding portion and the at least one adjustment portion, and
the at least one protruding portion and the at least one adjustment portion are alternately arranged in the one lead.

10. The thread forming tap according to claim 5, wherein
in the one lead, the male thread portion is provided with the same number of and a plurality of the at least one protruding portion and the at least one adjustment portion, and
the at least one protruding portion and the at least one adjustment portion are alternately arranged in the one lead.

* * * * *